United States Patent
Xu et al.

(10) Patent No.: US 11,219,915 B2
(45) Date of Patent: Jan. 11, 2022

(54) POSITIONING CLAMP FOR SPRAY-COATING OF WHEEL TRIM RING

(71) Applicant: CITIC DICASTAL CO., LTD, Hebei (CN)

(72) Inventors: Zuo Xu, Hebei (CN); Xiao Liu, Hebei (CN); Yudong Li, Hebei (CN); Xiaopeng Chen, Hebei (CN)

(73) Assignee: CITIC DICASTAL CO., LTD., Hebei (CN)

( * ) Notice: Subject to any disclaimer, the term of this patent is extended or adjusted under 35 U.S.C. 154(b) by 112 days.

(21) Appl. No.: 16/596,273

(22) Filed: Oct. 8, 2019

(65) Prior Publication Data

US 2020/0222932 A1 Jul. 16, 2020

(30) Foreign Application Priority Data

Jan. 15, 2019 (CN) .......................... 201910034695.8

(51) Int. Cl.
*B05B 13/02* (2006.01)
*B05C 13/02* (2006.01)

(52) U.S. Cl.
CPC .......... *B05B 13/0285* (2013.01); *B05C 13/02* (2013.01); *B23B 2260/03* (2013.01)

(58) Field of Classification Search
CPC ..... B05B 13/0285; B05C 13/02; B60B 21/00; B23Q 7/047; B21D 53/30; B23B 2260/03

USPC .................. 118/500, 503; 29/894.35, 894.38, 29/894.381; 301/95.101
See application file for complete search history.

(56) References Cited

U.S. PATENT DOCUMENTS 10,391,534 B1 * 8/2019 Neubauer ................ B21D 1/06
2019/0111466 A1 * 4/2019 Klatte ..................... B21D 53/30

FOREIGN PATENT DOCUMENTS

WO WO-2005099942 A1 * 10/2005 ............. B23B 31/18

* cited by examiner

*Primary Examiner* — Laura Edwards
(74) *Attorney, Agent, or Firm* — Cooper Legal Group, LLC

(57) ABSTRACT

A positioning clamp for spray-coating of a wheel trim ring includes a lower base plate, a circular bracket, an upper base plate, a plurality of guide rods, a plurality of sliding support parts and a distance adjusting mechanism. The distance adjusting mechanism is configured to drive the plurality of sliding support parts to approach a central position along the guide rods and to move away from the central position along the guide rods. According to the positioning clamp for spray-coating of the wheel trim ring, the position of each sliding support part can be adjusted to adapt to wheel trim rings of different sizes. Therefore, the positioning clamp for spray-coating of the wheel trim ring can replace a large number of positioning clamps of different sizes, and has the advantages of being simple in structure, stable and reliable in positioning, low in manufacturing cost and the like.

13 Claims, 6 Drawing Sheets

POSITIONING CLAMP FOR SPRAY-COATING OF WHEEL TRIM RING

CROSS REFERENCE TO RELATED APPLICATION

This application claims priority to Chinese Patent Application No. 201910034695.8, entitled POSITIONING CLAMP FOR SPRAY-COATING OF WHEEL TRIM RING and filed on Jan. 15, 2019, which is incorporated herein by reference for all purposes.

FIELD OF THE INVENTION

The application relates to a clamp, in particular to a positioning clamp for spray-coating of a wheel trim ring.

BACKGROUND OF THE INVENTION

A wheel trim ring is of a circular flat structure, and a plurality of threaded holes or unthreaded holes are uniformly distributed on the circumference of the structure. After a machining process, coating of the wheel trim ring starts, and several layers of powder or paint and other attachments need to be sprayed on the surface of the wheel trim ring to protect the trim. A wheel is fixed on a transfer line by a positioning clamp and conveyed to a spraying chamber. At present, large-scale wheel manufacturers design and manufacture a positioning fixture of a corresponding size for the wheel trim ring of each size. With the increasing diversification of market demands, a lot of different sizes of wheel trim rings are required, and there are no rules to follow. For a spraying workshop of the wheel manufacturer, with the increase of product types, a large number of positioning clamps are required, while some positioning clamps are of special sizes, which are no longer needed after being used once, as a result, more and more positioning clamps which are no longer used are overstocked in the warehouse.

SUMMARY OF THE INVENTION

The disclosure aims to provide a positioning clamp for spray-coating of a wheel trim ring, which is suitable for a large size range, and has high positioning flexibility, a simple structure and reliable positioning performance.

In order to achieve the above object, the technical solution adopted by the present disclosure is:

A positioning clamp for spray-coating of a wheel trim ring comprises a lower base plate, a circular bracket, an upper base plate, a plurality of guide rods, a plurality of sliding support parts and a distance adjusting mechanism; wherein the circular bracket is welded to the lower base plate, the upper base plate is welded at the middle position in the circular bracket, a circular hole is formed in the middle position of the upper base plate, the guide rods penetrate through the circular bracket and are horizontally and fixedly installed at the upper end of the distance adjusting mechanism, and the sliding support parts can slide along the guide rods; the distance adjusting mechanism passes through the circular hole formed in the middle position of the upper base plate and is fixed on the lower base plate and the upper base plate, the upper end of the distance adjusting mechanism is slightly higher than the height of the guide rod, and the distance adjusting mechanism can drive the plurality of sliding support parts to approach a central position along the guide rods and to move away from the central position along the guide rods.

Preferably, the distance adjusting mechanism comprises an air cylinder, a support plate, third rotating shafts, first guide columns, first rotating shafts, second rotating shafts, sliding blocks, connecting rods, fourth rotating shafts and a chute base; wherein the numbers of the third rotating shafts, the first guide columns, the first rotating shafts, the second rotating shafts, the sliding blocks, the connecting rods and the fourth rotating shafts are all more than one and are the same as the number of the sliding support parts; the bottom of the air cylinder is fixedly connected to the lower base plate, a piston rod of the air cylinder is fixedly connected with the support plate above the air cylinder, and the plurality of third rotating shafts are uniformly installed on the support plate in a circumferential direction; each third rotating shaft is provided with the corresponding first guide column through clearance fit, the upper end of each first guide column is installed on the corresponding sliding block through the corresponding first rotating shaft, and each sliding block is movably connected with the corresponding connecting rod through the corresponding second rotating shaft; both ends of each connecting rod are movably connected with the corresponding sliding support part and the corresponding sliding block through the corresponding fourth rotating shaft and the corresponding second rotating shaft respectively; the chute base is fixedly arranged on the upper base plate, and the guide rods are fixedly arranged on the upper end of the chute base; a plurality of vertical chutes with the same number as the first guide columns are arranged on the chute base, and the first guide columns and the sliding blocks can slide up and down in the chutes on the chute base; the piston rod of the air cylinder extends to push the support plate to move upwards, and the support plate pushes the first guide columns and the sliding blocks to move upwards, so that the connecting rods approach the guide rods, and the plurality of sliding support parts are far away from the central position along the guide rods; and the piston rod of the air cylinder contracts to drive the support plate to move downwards, and the support plate drives the first guide columns and the sliding blocks to move downwards, so that the connecting rods are far away from the guide rods, and the plurality of sliding support parts approach the central position along the guide rods.

Preferably, a plurality of threaded holes are uniformly distributed along one side of the chutes from bottom to top in a direction perpendicular to the sliding blocks on the circumference of the chute base, and by using set screws, the positions of the sliding blocks can be fixed, thus fixing the positions of the sliding support parts.

Preferably, a plurality of threaded holes are uniformly distributed along one side of the chutes from bottom to top in a direction perpendicular to the sliding blocks on the circumference of the chute base, adjusting bolts are arranged in the threaded holes, and by rotating the adjusting bolts at the positions of the sliding blocks, the positions of the sliding blocks can be fixed, thus fixing the positions of the sliding support parts.

Preferably, the length of each connecting rod is adjustable.

Preferably, each sliding support part comprises a sliding base, a spring, a second guide column, a guide sleeve and a conical base, wherein the lower end of the sliding base is provided with a through hole, the corresponding guide rod is inserted into a middle through hole of the sliding base, and the lower end of the sliding base is connected with the corresponding connecting rod through the fourth corresponding rotating shaft; the upper end of the sliding base is a hollow cylinder, the lower end of the second guide column passes through the hollow cylinder to be fixedly installed at the middle position of the sliding base, and the guide sleeve is embedded in a blind hole in the lower end of the conical base through interference fit; and a blind hole in the lower end of the guide sleeve receives the second guide column with a certain gap left, the spring passes through the guide sleeve and is freely placed between the conical base and the sliding base, and a certain gap exists between the conical base and the sliding base to ensure the free vertical sliding of the conical base.

Preferably, the upper portion of the conical base is a cone, the lower portion of the conical base is a cylinder, and the conical base is placed in the hollow cylinder of the sliding base; and the bottom surface of the conical base is provided with a circular groove around the blind hole, and the spring is placed in the circular groove.

Preferably, the conical base is made of a non-metallic material such as nylon, which further prevents the positioning clamp from pressing a bolt hole of the trim ring.

Compared with the prior art, the disclosure has the beneficial effects that: according to the positioning clamp for spray-coating of the wheel trim ring, a position of each sliding support part can be adjusted to adapt to wheel trim rings of different sizes; the springs can allow the conical bases to move freely in the axial direction and have a certain damping effect, thus effectively avoiding the impact of the positioning clamp on the bolt hole of the trim ring and indentations caused thereby compared with a traditional hard contact positioning clamp; the conical bases can be made of a non-metallic material such as nylon, which further prevents the positioning clamp from pressing the bolt hole of the trim ring; therefore, the positioning clamp for spray-coating of the wheel trim ring can replace a large number of positioning clamps of different sizes, and has the advantages of being simple in structure, stable and reliable in positioning, low in manufacturing cost and the like.

Figure 1:
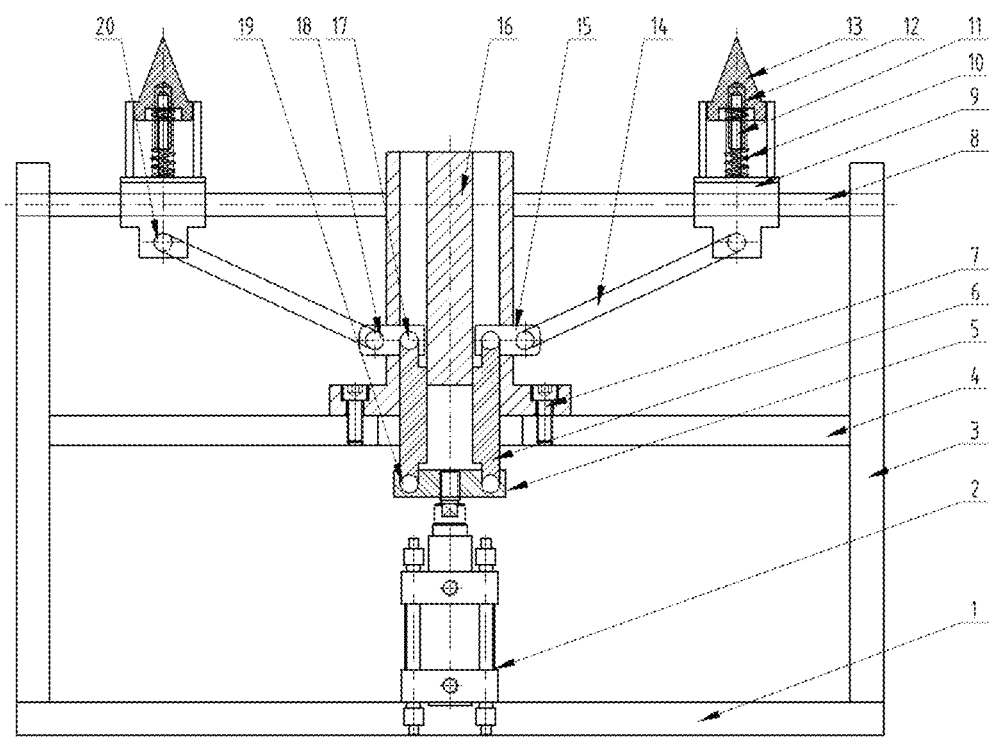
FIG. 1 is a front view of a positioning clamp for spray-coating of a wheel trim ring.
Figure 2:
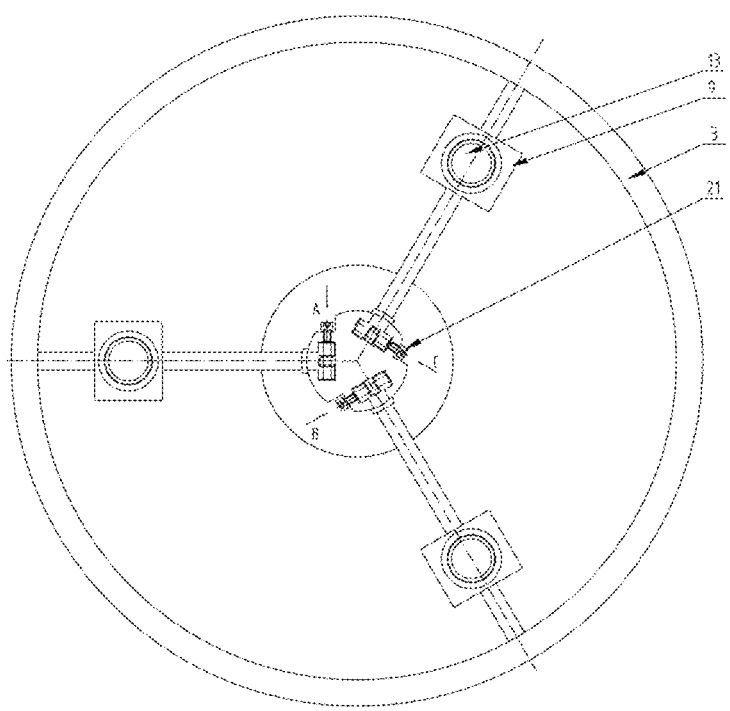
FIG. 2 is a top view of a positioning clamp for spray-coating of a wheel trim ring.

In the drawings:
1—lower base plate, 2—air cylinder, 3—circular bracket, 4—upper base plate, 5—support plate, 6—first guide column, 7—screw, 8—guide rod, 9—sliding base, 10—spring, 11—second guide column, 12—guide sleeve, 13—conical base, 14—connecting rod, 15—sliding block, 16—chute base, 17—first rotating shaft, 18—second rotating shaft, 19—third rotating shaft, 20—fourth rotating shaft, 21—set screw.

DETAILED DESCRIPTION OF THE EMBODIMENTS

Embodiment 1

The specific embodiments of the present application will be described in further detail below with reference to the accompanying drawings 1-6.

A positioning clamp for spray-coating of a wheel trim ring comprises a base plate 1, an air cylinder 2, a circular bracket 3, an upper base plate 4, a support plate 5, first guide columns 6, screws 7, guide rods 8, sliding bases 9, springs 10, second guide columns 11, guide sleeves 12, conical bases 13, connecting rods 14, sliding blocks 15, a chute base 16, rotating shafts I 17, second rotating shafts 18, third rotating shafts 19, fourth rotating shafts 20 and set screws 21. The circular bracket 3 is welded to the lower base plate 1, the upper base plate 4 is welded at the middle position in the circular bracket 3, and a circular hole is formed in the middle position of the upper base plate 4; the bottom of the air cylinder 2 is fixedly connected to the lower base plate 1, an upper screw of the air cylinder 2 is provided with the support plate 5 through threaded connection, and the three third rotating shafts 19 are uniformly arranged on the support plate 5 in a circumferential direction; each third rotating shaft 19 is provided with the corresponding first guide column 6 through clearance fit, the upper end of each first guide column 6 is installed on the corresponding sliding block 15 through the corresponding first rotating shaft 17, and both ends of each connecting rod 14 are connected with and installed at a through hole in the lower end of the corresponding sliding base 9 and an opening in the corresponding sliding block 15 through the corresponding fourth rotating shaft 20 and the corresponding second rotating shaft 18 respectively; the chute base 16 is arranged on the upper base plate 4 through the three screws 7, and the guide rods 8 penetrate through the circular bracket 3 and are fixedly arranged on the upper end of the chute base 16; the sliding bases 9 are installed on the guide rods 8 through through holes in the lower ends, the lower end of each second guide column 11 is fixedly installed at the middle position of the corresponding sliding base 9, and each guide sleeve 12 is embedded in a blind hole in the lower end of the corresponding conical base 13 through interference fit; a blind hole in the lower end of each guide sleeve 12 receives the corresponding second guide column 11 with a certain gap left, each spring 10 passes through the corresponding guide sleeve 12 and is freely placed between the corresponding conical base 13 and the corresponding sliding base 9, and a certain gap exists between each conical base 13 and the corresponding sliding base 9 to ensure the free vertical sliding of the conical base 13; and a plurality of threaded holes are uniformly distributed in a circumferential direction of the chute base 16 from bottom to top, and the set screw 21 can use one of the threaded holes to press the sliding block 15 inside the chute base 16 to make the sliding block 15 stationary as required.

In actual use, according to the pitch diameter of the bolt hole in the trim ring, the air cylinder 2 is started, so that the first guide columns 6 slide in the chutes in the chute base 16, the sliding bases 9 are driven to slide along the guide rods 8 to the position with the pitch diameter by the connecting rods 14, the sliding blocks 15 are pressed inside the chute base 16 by the set screws 21, at this point, a radial position of each conical base 13 in the positioning clamp is the same as the pitch diameter of the bolt hole in the trim ring, and the trim ring is clamped with a manipulator (or manually) and placed at a corresponding position of the positioning clamp; and under the gravity of the trim ring, the conical bases 13 move downwards along an axial direction of the second guide columns 11 until the upper plane of each sliding base 9 contacts the trim ring, the trim ring is reliably positioned on the clamp, and the positioning clamp drives the trim ring to enter a spraying chamber to start the coating process.

The conical bases 13 can move along the axial direction under the double guidance of the second guide columns 11 and annular inner walls of the upper ends of the sliding bases 9, thus being more stable and reliable. A clearance between each conical base 13 and the annular inner wall of the upper end of the corresponding sliding base 9 is 0.5 mm, a clearance between the blind hole in the lower end of each guide sleeve 12 and the corresponding second guide column 11 is 0.5-1 mm, and a clearance between each guide column I and a groove in the chute base is 0.5 mm; the springs 10 can allow the conical bases 13 to move freely in the axial direction and have a certain damping effect, thus effectively avoiding the impact of the positioning clamp on the bolt hole of the trim ring and indentations caused thereby compared with a traditional hard contact positioning clamp. The conical bases 13 can be made of a non-metallic material such as nylon, which further prevents the positioning clamp from pressing the bolt hole of the trim ring.

Figure 3:
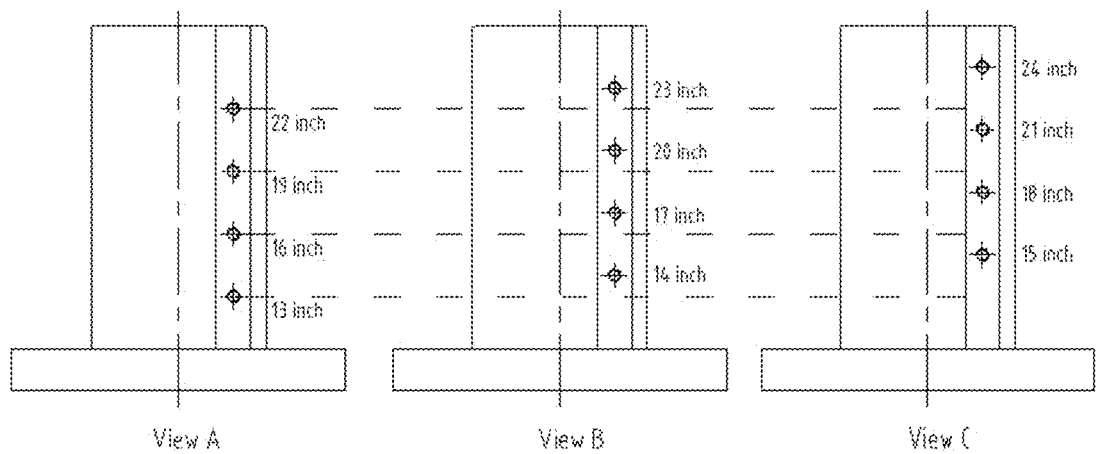
FIG. 3 is a schematic view of the positions of set screws of a positioning clamp for spray-coating of a wheel trim ring.
Figure 4:
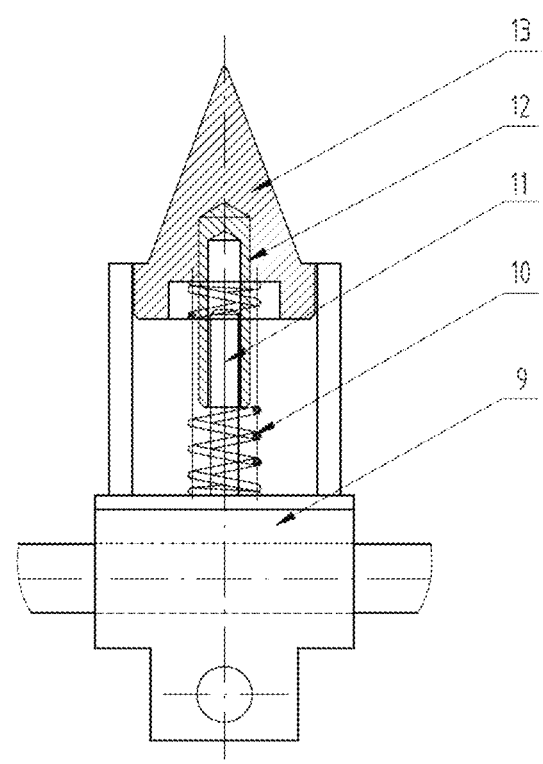
FIG. 4 is a front view of a conical sleeve of a positioning clamp for spray-coating of a wheel trim ring.
Figure 5:
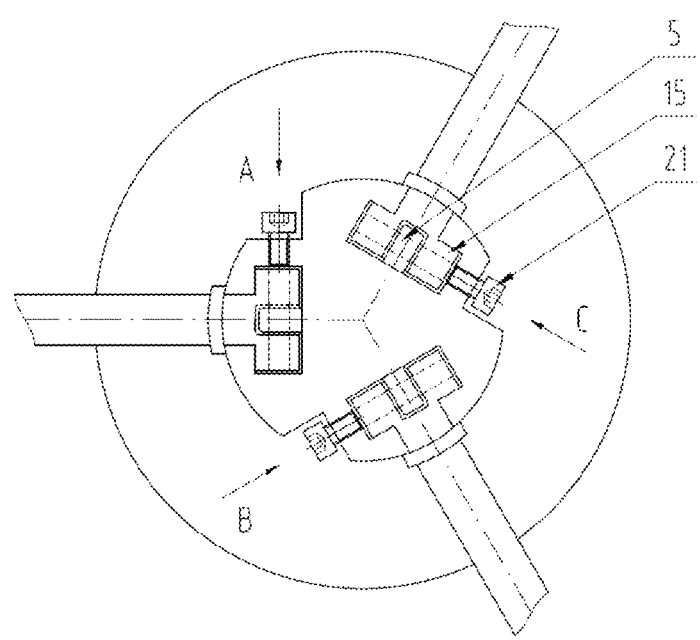
FIG. 5 is a partial view of a positioning clamp for spray-coating of a wheel trim ring.
Figure 6:
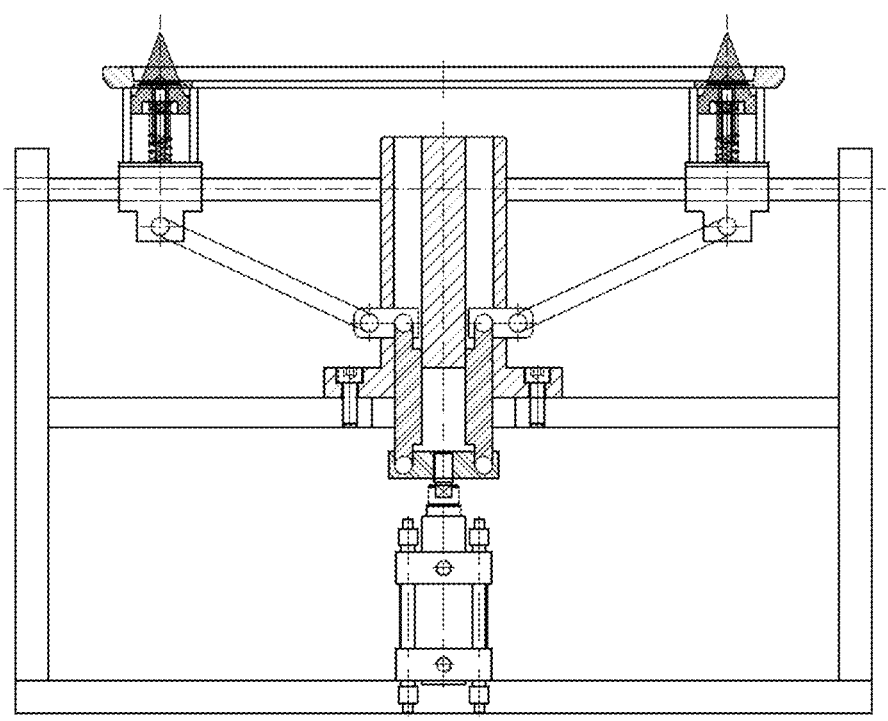
FIG. 6 is an actual installation front view of a positioning clamp for spray-coating of a wheel trim ring.

In three projection directions on a circumference of the chute base 16, a plurality of threaded holes are uniformly distributed from bottom to top, and the radial positions of the conical bases 13 in the positioning clamp are matched with the pitch diameter of the bolt hole of the trim ring by fixing the positions of the sliding blocks 15 with the set screws 21. The disclosure is not limited to the wheel size range of 13, 14-24 inches as shown in FIG. 3, which is used to illustrate the clamping positioning mode of the disclosure which is adaptable to various sizes. If larger or smaller wheels appear, the wheel size range can be expanded by increasing the length ranges of relevant parts such as the guide rods 8 and the connecting rods 14.

Embodiment 2

A positioning clamp for spray-coating of a wheel trim ring comprises a lower base plate 1, a circular bracket 3, an upper base plate 4, a plurality of guide rods 8, a plurality of sliding support parts and a distance adjusting mechanism; wherein the circular bracket 3 is welded to the lower base plate 1, the upper base plate 4 is welded at the middle position in the circular bracket 3, and a circular hole is formed in the middle position of the upper base plate 4; the guide rods 8 penetrate through the circular bracket 3 and are horizontally and fixedly installed at the upper end of the distance adjusting mechanism, the sliding support parts can slide along the guide rods, and the plurality of guide rods 8 and the plurality of sliding support parts are uniformly distributed along the circumference; and the distance adjusting mechanism passes through the circular hole formed in the middle position of the upper base plate and is fixed on the lower base plate and the upper base plate, the upper end of the distance adjusting mechanism is slightly higher than the height of the guide rod, and the distance adjusting mechanism can drive the plurality of sliding support parts to approach a central position along the guide rods and to move away from the central position along the guide rods.

The distance adjusting mechanism comprises an air cylinder 2, a support plate 5, third rotating shafts 19, first guide columns 6, first rotating shafts 17, second rotating shafts 18, sliding blocks 15, connecting rods 14, fourth rotating shafts 20 and a chute base 16; wherein the numbers of the third rotating shafts 19, the first guide columns 6, the first rotating shafts 17, the second rotating shafts 18, the sliding blocks 15, the connecting rods 14 and the fourth rotating shafts 20 are all more than one and are the same as the number of the sliding support parts; the bottom of the air cylinder 2 is fixedly connected to the lower base plate 1, a piston rod of the air cylinder is fixedly connected with the support plate 5 above the air cylinder, and the plurality of third rotating shafts 19 are uniformly installed on the support plate 5 in a circumferential direction; each third rotating shaft 19 is provided with the corresponding first guide column 6 through clearance fit, the upper end of each first guide column 6 is installed on the corresponding sliding block 15 through the corresponding first rotating shaft 17, and each sliding block 15 is movably connected with the corresponding connecting rod 14 through the corresponding second rotating shaft 18; both ends of each connecting rod 14 are movably connected with the corresponding sliding support part and the corresponding sliding block 15 through the corresponding fourth rotating shaft 20 and the corresponding second rotating shaft 18 respectively; the chute base 16 is fixedly arranged on the upper base plate 4, and the guide rods 8 penetrate through the circular bracket and are fixedly arranged on the upper end of the chute base 16; a plurality of vertical chutes with the same number as the first guide columns 6 are arranged on the chute base 16, and the first guide columns 6 and the sliding blocks 15 can slide up and down in the chutes on the chute base 16; the piston rod of the air cylinder 2 extends to push the support plate 5 to move upwards, and the support plate pushes the first guide columns 6 and the sliding blocks 15 to move upwards, so that the connecting rods 14 approach the guide rods 8, and the plurality of sliding support parts are far away from the central position along the guide rods; and the piston rod of the air cylinder contracts to drive the support plate 5 to move downwards, and the support plate drives the first guide columns 6 and the sliding blocks 15 to move downwards, so that the connecting rods are far away from the guide rods 8, and the plurality of sliding support parts approach the central position along the guide rods 8. A plurality of threaded holes are uniformly distributed along one side of the chutes from bottom to top in a direction perpendicular to the sliding blocks on the circumference of the chute base 16, adjusting bolts are arranged in the threaded holes, and by rotating the adjusting bolts at the positions of the sliding blocks, the positions of the sliding blocks can be fixed, thus fixing the positions of the sliding support parts, as shown in FIG. 3. The length of each connecting rod 14 can be adjusted so as to be widely adapted to positioning clamps of different sizes and specifications.

Each sliding support part comprises a sliding base 9, a spring 10, a second guide column 11, a guide sleeve 12 and a conical base 13, wherein the lower end of the sliding base 9 is provided with a through hole, the corresponding guide rod 8 is inserted into a middle through hole of the sliding base 9, and the lower end of the sliding base 9 is connected with the corresponding connecting rod 14 through the corresponding fourth rotating shaft 20; the upper end of the sliding base 9 is a hollow cylinder, the lower end of the second guide column 11 passes through the hollow cylinder to be fixedly installed at the middle position of the sliding base 9, and the guide sleeve 12 is embedded in a blind hole in the lower end of the conical base 13 through interference fit; and a blind hole in the lower end of the guide sleeve 12 receives the second guide column 11 with a certain gap left, the spring 10 passes through the guide sleeve 12 and is freely placed between the conical base 13 and the sliding base 9, and a certain gap exists between the conical base 13 and the sliding base 9 to ensure the free vertical sliding of the conical base 13. The upper portion of the conical base 13 is a cone, the lower portion of the conical base is a cylinder, and the conical base is placed in the hollow cylinder of the sliding base; and the bottom surface of the conical base 13 is provided with a circular groove around the blind hole, and the spring 10 is placed in the circular groove. The conical base 13 is made of nylon or other non-metallic materials with certain tenacity, which further prevents the positioning clamp from pressing the bolt hole of the trim ring.

Visibly, the application provides a positioning clamp for spray-coating of a wheel trim ring, comprising a lower base plate, a circular bracket, an upper base plate, a plurality of guide rods, a plurality of sliding support parts and a distance adjusting mechanism. The distance adjusting mechanism can drive the plurality of sliding support parts to approach a central position along the guide rods and to move away from the central position along the guide rods. According to the positioning clamp for spray-coating of the wheel trim ring, the position of each sliding support part can be adjusted to adapt to wheel trim rings of different sizes, and the compression of the positioning clamp on a bolt hole of the trim ring is reduced. Therefore, the positioning clamp for spray-coating of the wheel trim ring can replace a large number of positioning clamps of different sizes, and has the advantages of being simple in structure, stable and reliable in positioning, low in manufacturing cost and the like.

The invention claimed is:

1. A positioning clamp for spray-coating of a wheel trim ring, comprising:
    a lower base plate, a circular bracket, an upper base plate, a plurality of guide rods, a plurality of sliding support parts and a distance adjusting mechanism;
    wherein the circular bracket is welded to the lower base plate, the upper base plate is welded at a middle position in the circular bracket, and a circular hole is formed in a middle position of the upper base plate;
    wherein the plurality of guide rods penetrate through the circular bracket and are horizontally and fixedly installed at an upper end of the distance adjusting mechanism, the plurality of sliding support parts are configured to slide along the plurality of guide rods, and the plurality of guide rods and the plurality of sliding support parts are uniformly distributed along a circumference of the circular bracket;
    wherein the distance adjusting mechanism passes through the circular hole formed in the middle position of the upper base plate and is fixed on the lower base plate and the upper base plate, the upper end of the distance adjusting mechanism is higher than a height of each of the plurality of guide rods, and the distance adjusting mechanism is configured to drive the plurality of sliding support parts to approach a central position along the plurality of guide rods and to move away from the central position along the plurality of guide rods; and
    wherein when the wheel trim ring is placed at the positioning clamp, under a gravity of the wheel trim ring, a conical base of each of the plurality of sliding support parts moves downwards along an axial direction of a second guide column of each of the plurality of sliding support parts until an upper plane of a sliding base of each of the plurality of sliding support parts contacts the wheel trim ring, so as to position the wheel trim ring on the positioning clamp.

2. The positioning clamp for spray-coating of the wheel trim ring according to claim 1, wherein the distance adjusting mechanism comprises an air cylinder, a support plate, first guide columns, first rotating shafts, second rotating shafts, third rotating shafts, sliding blocks, connecting rods, fourth rotating shafts and a chute base;
    wherein the numbers of the third rotating shafts, the first guide columns, the first rotating shafts, the second rotating shafts, the sliding blocks, the connecting rods and the fourth rotating shafts are all more than one and are the same as the number of the plurality of sliding support parts;
    wherein a bottom of the air cylinder is fixedly connected to the lower base plate, a piston rod of the air cylinder is fixedly connected with the support plate above the air cylinder, and the third rotating shafts are uniformly installed on the support plate in a circumferential direction;
    wherein each of the third rotating shafts is provided with a corresponding one of the first guide columns through clearance fit, an upper end of each of the first guide columns is installed on a corresponding one of the sliding blocks through a corresponding one of the first rotating shafts, and each of the sliding blocks is movably connected with a corresponding one of the connecting rods through a corresponding one of the second rotating shafts;
    wherein both ends of each of the connecting rods are movably connected with a corresponding one of the plurality of sliding support parts and the corresponding one of the sliding blocks through a corresponding one of the fourth rotating shafts and the corresponding one of the second rotating shafts respectively;
    wherein the chute base is fixedly arranged on the upper base plate, and the plurality of guide rods are fixedly arranged on an upper end of the chute base;
    wherein a plurality of vertical chutes with the same number as the first guide columns are arranged on the chute base, and the first guide columns and the sliding blocks are configured to slide up and down in the vertical chutes on the chute base;
    wherein the piston rod of the air cylinder extends to push the support plate to move upwards, and the support plate pushes the first guide columns and the sliding blocks to move upwards, so that the connecting rods approach the plurality of guide rods, and the plurality of sliding support parts are far away from the central position along the plurality of guide rods; and
    wherein the piston rod of the air cylinder contracts to drive the support plate to move downwards, and the support plate drives the first guide columns and the sliding blocks to move downwards, so that the connecting rods are far away from the plurality of guide rods, and the plurality of sliding support parts approach the central position along the plurality of guide rods.

3. The positioning clamp for spray-coating of the wheel trim ring according to claim 2, wherein a plurality of threaded holes are uniformly distributed along one side of the vertical chutes from bottom to top in a direction perpendicular to the sliding blocks on a circumference of the chute base, adjusting bolts are arranged in the plurality of threaded holes, and by rotating the adjusting bolts at positions of the sliding blocks, the positions of the sliding blocks are configured to be fixed, thus fixing positions of the plurality of sliding support parts.

4. The positioning clamp for spray-coating of the wheel trim ring according to claim 2, wherein a length of each of the connecting rods is adjustable.

5. The positioning clamp for spray-coating of the wheel trim ring according to claim 2, wherein each of the plurality of sliding support parts comprises the sliding base, a spring, the second guide column, a guide sleeve and the conical base;
    wherein a lower end of the sliding base is provided with a through hole, a corresponding one of the plurality of guide rods is inserted into a middle through hole of the sliding base, and the lower end of the sliding base is connected with the corresponding one of the connecting rods through the corresponding one of the fourth rotating shafts;

wherein an upper end of the sliding base is a hollow cylinder, a lower end of the second guide column passes through the hollow cylinder to be fixedly installed at a middle position of the sliding base, the guide sleeve is embedded in a blind hole in a lower end of the conical base through interference fit; and wherein a blind hole in a lower end of the guide sleeve receives the second guide column with a gap left, the spring passes through the guide sleeve and is freely placed between the conical base and the sliding base, and a gap exists between the conical base and the sliding base to ensure free vertical sliding of the conical base.

6. The positioning clamp for spray-coating of the wheel trim ring according to claim 5, wherein an upper portion of the conical base includes a cone, a lower portion of the conical base includes a cylinder, and the conical base is placed in the hollow cylinder of the sliding base; and a bottom surface of the conical base includes a circular groove around the blind hole in the lower end of the conical base, and the spring is placed in the circular groove.

7. The positioning clamp for spray-coating of the wheel trim ring according to claim 6, wherein the conical base comprises nylon.

8. The positioning clamp for spray-coating of the wheel trim ring according to claim 3, wherein each of the plurality of sliding support parts comprises the sliding base, a spring, the second guide column, a guide sleeve and the conical base;

wherein a lower end of the sliding base is provided with a through hole, a corresponding one of the plurality of guide rods is inserted into a middle through hole of the sliding base, and the lower end of the sliding base is connected with the corresponding one of the connecting rods through the corresponding one of the fourth rotating shafts;

wherein an upper end of the sliding base is a hollow cylinder, a lower end of the second guide column passes through the hollow cylinder to be fixedly installed at a middle position of the sliding base, the guide sleeve is embedded in a blind hole in a lower end of the conical base through interference fit; and wherein a blind hole in a lower end of the guide sleeve receives the second guide column with a gap left, the spring passes through the guide sleeve and is freely placed between the conical base and the sliding base, and a gap exists between the conical base and the sliding base to ensure free vertical sliding of the conical base.

9. The positioning clamp for spray-coating of the wheel trim ring according to claim 8, wherein an upper portion of the conical base includes a cone, a lower portion of the conical base includes a cylinder, and the conical base is placed in the hollow cylinder of the sliding base; and wherein a bottom surface of the conical base includes a circular groove around the blind hole in the lower end of the conical base, and the spring is placed in the circular groove.

10. The positioning clamp for spray-coating of the wheel trim ring according to claim 9, wherein the conical base comprises nylon.

11. The positioning clamp for spray-coating of the wheel trim ring according to claim 4, wherein each of the plurality of sliding support parts comprises the sliding base, a spring, the second guide column, a guide sleeve and the conical base;

wherein a lower end of the sliding base is provided with a through hole, a corresponding one of the plurality of guide rods is inserted into a middle through hole of the sliding base, and the lower end of the sliding base is connected with the corresponding one of the connecting rods through the corresponding one of the fourth rotating shafts;

wherein an upper end of the sliding base is a hollow cylinder, a lower end of the second guide column passes through the hollow cylinder to be fixedly installed at a middle position of the sliding base, the guide sleeve is embedded in a blind hole in a lower end of the conical base through interference fit; and wherein a blind hole in a lower end of the guide sleeve receives the second guide column with a gap left, the spring passes through the guide sleeve and is freely placed between the conical base and the sliding base, and a gap exists between the conical base and the sliding base to ensure free vertical sliding of the conical base.

12. The positioning clamp for spray-coating of the wheel trim ring according to claim 11, wherein an upper portion of the conical base includes a cone, a lower portion of the conical base includes a cylinder, and the conical base is placed in the hollow cylinder of the sliding base; and wherein a bottom surface of the conical base includes a circular groove around the blind hole in the lower end of the conical base, and the spring is placed in the circular groove.

13. The positioning clamp for spray-coating of the wheel trim ring according to claim 12, wherein the conical base comprises nylon.

* * * * *